US012589348B2

(12) United States Patent
Song et al.

(10) Patent No.: US 12,589,348 B2
(45) Date of Patent: Mar. 31, 2026

(54) DEVICE FOR SEPARATING AND SEQUESTERING CARBON DIOXIDE IN GAS MIXTURES BY HYDRATE METHOD WITH COUPLED COLD STORAGE

(71) Applicant: DALIAN UNIVERSITY OF TECHNOLOGY, Dalian (CN)

(72) Inventors: Yongchen Song, Dalian (CN); Lanlan Jiang, Dalian (CN); Mingjun Yang, Dalian (CN); Zucheng Cheng, Dalian (CN); Yu Liu, Dalian (CN); Yingying Liu, Dalian (CN); Bingbing Chen, Dalian (CN); Cong Chen, Dalian (CN); Jiafei Zhao, Dalian (CN); Yi Zhang, Dalian (CN)

(73) Assignee: Dalian University of Technology, Dalian (CN)

( * ) Notice: Subject to any disclaimer, the term of this patent is extended or adjusted under 35 U.S.C. 154(b) by 343 days.

(21) Appl. No.: 18/191,898

(22) Filed: Mar. 29, 2023

(65) Prior Publication Data

US 2023/0311052 A1     Oct. 5, 2023

(51) Int. Cl.
 B01D 53/00      (2006.01)
 C01B 32/50      (2017.01)
 C10L 3/10       (2006.01)

(52) U.S. Cl.
 CPC ............ B01D 53/002 (2013.01); C01B 32/50 (2017.08); C10L 3/108 (2013.01);
         (Continued)

(58) Field of Classification Search
 CPC ............ B01D 53/002; B01D 2256/245; B01D 2257/504; B01D 2258/05;
         (Continued)

(56) References Cited

U.S. PATENT DOCUMENTS

2007/0248527 A1* 10/2007 Spencer .................. C01B 32/50
                                                        423/220
2010/0113845 A1*  5/2010 Osegovic ................ C10L 3/102
                                                        585/15
2023/0234843 A1*  7/2023 Hobby ........................ C10J 3/82
                                                        585/242

FOREIGN PATENT DOCUMENTS

CN        103861444 B  * 10/2015
CN        113117504 A  *  7/2021   ............. B01D 53/72

OTHER PUBLICATIONS

Translation of CN-103861444-B (Year: 2015).*
Translation of CN-113117504-A (Year: 2021).*

* cited by examiner

Primary Examiner — Jennifer Dieterle
Assistant Examiner — Phillip Y Shao
(74) Attorney, Agent, or Firm — CBM PATENT CONSULTING, LLC

(57)              ABSTRACT

A device for separating and sequestrating carbon dioxide coupled with cold storage in mixed gas via hydrate method, which belongs to the technical field of application of natural gas hydrates includes a gas compression device, a refrigeration cycle device, a hydrate formation/decomposition device, a hydrate cold storage device, a water circulation device and a sensing and monitoring device; taking the separation and sequestration of biogas as an example, the refrigeration cycle device enables the cooling of biogas, decomposition of gas at all levels, hydrate, and circulating water to provide the low-temperature conditions required for hydrate formation; the hydrate cold energy storage device can fully use the latent heat of hydrate phase change to provide the required cooling capacity on the user side; the water circulation device can realize the recycling of decom- (Continued)

position water to ensure the continuous formation of hydrate.

5 Claims, 1 Drawing Sheet

(52) U.S. Cl.
CPC .. *B01D 2256/245* (2013.01); *B01D 2257/504* (2013.01); *B01D 2258/05* (2013.01); *C01B 2210/0009* (2013.01); *C10L 2290/06* (2013.01)

(58) Field of Classification Search
CPC .......... B01D 2252/103; B01D 53/1475; C01B 32/50; C01B 2210/0009; C10L 3/104; C10L 3/108; C10L 2290/06; E21B 41/0064; F25D 5/00; F25D 2220/40; F25D 2220/68; Y02C 20/40
See application file for complete search history.

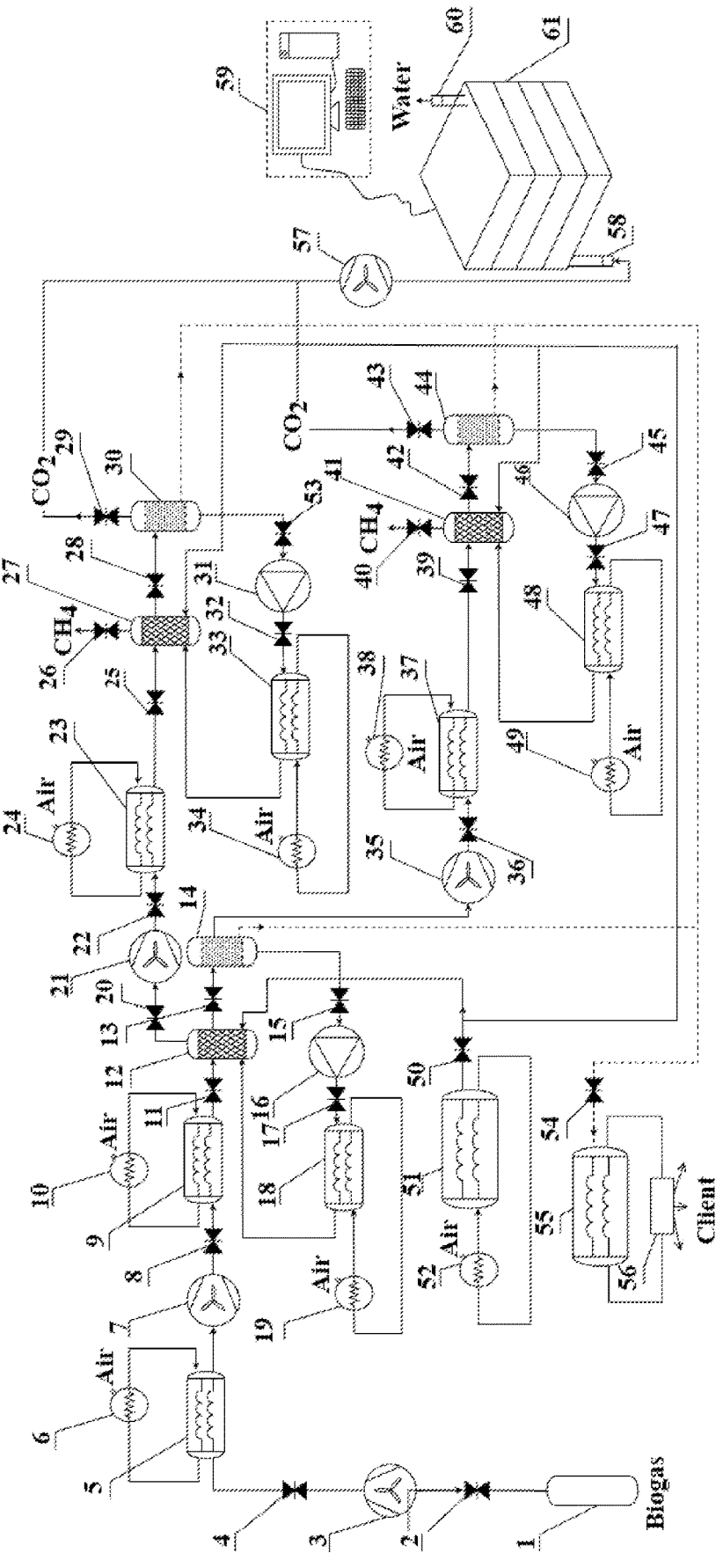

DEVICE FOR SEPARATING AND SEQUESTERING CARBON DIOXIDE IN GAS MIXTURES BY HYDRATE METHOD WITH COUPLED COLD STORAGE

CROSS-REFERENCE TO RELATED APPLICATIONS

This application claims priority to Chinese Patent Application Ser. No. CN202210338687.4 filed on 1 Apr. 2022.

TECHNICAL FIELD

The present invention belongs to the technical field of application of natural gas hydrates, and relates to an experimental apparatus for recovering and sequestrating carbon dioxide from a gas mixture using the hydrate method.

BACKGROUND ART

Due to the dramatic changes of global climates caused by global warming, the governments and people of various countries have been paying more and more attention to the application technology of carbon dioxide capture and sequestration as an effective means to deal with global warming, and the hydrate method of carbon capture and sequestration technology has essential application prospects.

Currently, carbon capture and sequestration technology by hydrate method is widely applied, focusing on the capture of pure carbon dioxide gas, and separation and sequestration equipments of mixed gas do not yet have mature integrated system equipment for integrated application in and out of the country. At the same time, combined with the advantage of high latent heat of phase transition of the hydrate, hydrate carbon dioxide capture coupled with cold storage can minimize energy loss and improve energy utilization. In addition, the potential of carbon dioxide sequestration in the ocean is enormous, which can sequester trillions of tons of carbon dioxide. The development of integrated technology for efficient and low energy consumption capture and storage of carbon dioxide is of great significance for China to achieve the development strategy of "Carbon Peak—Carbon Neutralization".

SUMMARY OF THE INVENTION

In order to solve the problems presented in the prior art, the present invention proposes a device for separating and storing carbon dioxide coupled with cold storage in mixed gas by hydrate method, which is not only of scientific research and teaching value, but also has the function of demonstration of results application, enormously improving the research level in the field of carbon emission reduction by hydrate method and promoting the technological development in this field.

The technical solution of the present invention is:

A device for separating and sequestrating carbon dioxide in mixed gas by hydrate method coupled with cold storage, taking the separation of carbon dioxide in biogas as an example, the gas separation system of the device is provided with a primary separation trunk circuit and two parallel separation branches. The primary separation trunk circuit is a biogas bottle, connected to a primary biogas refrigeration cycle heat exchanger by a primary gas compressor and then connected to a secondary biogas refrigeration cycle heat exchanger by a secondary gas compressor, and then connected in turn to a primary hydrate formation reactor and a primary hydrate decomposition reactor. Said primary hydrate decomposition reactor is connected to the primary hydrate formation reactor via a primary hydrate pump and a primary hydrate heat exchanger. Said primary biogas refrigeration cycle heat exchanger is connected to a primary biogas cooling tower for circulating heat exchange, and the secondary biogas refrigeration cycle heat exchanger is connected to a secondary biogas cooling tower for circulating heat exchange.

The parallel separation branches include two: the first one is for the recovery of carbon dioxide gas in the higher concentration methane separation gas, and the second one is for the purification of carbon dioxide gas in the primary hydrate decomposition gas. The first branch passes in sequence the primary hydrate formation reactor through a secondary high concentration methane compressor, a secondary high concentration methane heat exchanger, a secondary high concentration methane hydrate formation reactor and a secondary high concentration methane hydrate decomposition reactor. The secondary high concentration methane hydrate decomposition reactor is connected to the secondary high concentration methane hydrate formation reactor via a methane hydrate decomposition water pump and a methane hydrate decomposition water heat exchanger. Said secondary high concentration methane heat exchanger is circulated with the secondary high concentration methane cooling tower, and the methane hydrate decomposition water heat exchanger is connected to a methane hydrate decomposition water cooling tower for circulating heat exchange.

The second branch passes from the primary hydrate decomposition reactor through a secondary high concentration carbon dioxide compressor, a secondary high concentration carbon dioxide heat exchanger, a secondary high concentration carbon dioxide hydrate formation reactor and a secondary high concentration carbon dioxide hydrate decomposition reactor in that order. The secondary high concentration carbon dioxide hydrate decomposition reactor is connected to the secondary high concentration carbon dioxide hydrate decomposition reactor after a carbon dioxide hydrate decomposition water pump and a carbon dioxide hydrate decomposition water heat exchangerformation. Said secondary high concentration carbon dioxide heat exchanger is in heat exchange cycle with a secondary high concentration carbon dioxide cooling tower, and the carbon dioxide hydrate decomposition water heat exchanger is in heat exchange cycle with a carbon dioxide hydrate decomposition water cooling tower.

The carbon dioxide sequestration system of the device is provided with a gas hydrate sequestration apparatus, which can collect all carbon dioxide gas obtained from the gas separation system, and sequester it as a gas hydrate in a porous medium. The separated carbon dioxide, after being pressed by a sequestration gas compressor, is injected through a carbon dioxide injection port into the porous medium and is stably sequestrated in the form of a hydrate of carbon dioxide. A water outlet is provided to maintain stable pressure of the porous medium. Various parameters of the porous medium are monitored in real time with a sequestration monitoring system.

The device also includes a total refrigeration system, which uses a system heat exchanger connected via pipelines to the primary hydrate formation reactor, the secondary high concentration methane hydrate formation reactor, and the secondary high concentration carbon dioxide hydrate formation reactor, respectively.

3

The device also includes a cold storage system, which uses the primary hydrate decomposition heat exchanger, the secondary high concentration methane hydrate decomposition reactor, and the secondary high concentration carbon dioxide hydrate decomposition reactor connected to a user-side heat exchanger via pipelines, respectively, and the user-side heat exchanger is connected to the user-side for heat exchange circulation.

The device also includes sensing and monitoring equipment, which comprises a temperature sensor, a pressure sensor, a displacement sensor, and a computer. The computer is used to process data and signals, the temperature sensor, the pressure sensor and the displacement sensor are used to convert the corresponding signals into electrical signals transmitted to the computer.

The present invention has the following beneficial effects:

The present invention proposes a gas separation device for recovering carbon dioxide in mixed gas using the hydrate method. The device can achieve multi-stage separation of methane gas and carbon dioxide gas in ambient biogas and can purify carbon dioxide gas several times, to obtain a high concentration of clean combustion gas-methane and a high concentration of greenhouse gas-carbon dioxide, eventually, the separated carbon dioxide gas can be effectively sequestered. Further, the device can be connected in series with the device in multiple stages to achieve higher purity of methane gas and carbon dioxide gas according to the user's needs. Furthermore, the hydrate cold storage apparatus of the device can transfer the hydrate residual cold to the user side through a plate heat exchanger to replace the conventional vapor compression refrigeration system, which can effectively reduce the refrigeration energy consumption. The device is simple to operate, has low process energy consumption, no added chemical reagents in the process, no secondary pollution, and has better environmental and economic benefits.

BRIEF DESCRIPTION OF DRAWINGS

FIG. is a flow chart of the device for separating and sequestering $CO_2$ coupled with cold storage in mixed gas by hydrate method.

Wherein:
1. biogas bottle
2. first valve
3. primary gas compressor
4. second valve
5. primary biogas refrigeration cycle heat exchanger
6. primary biogas cooling tower
7. secondary gas compressor
8. third valve
9. secondary biogas refrigeration cycle heat exchanger
10. secondary biogas cooling tower
11. fourth valve
12. primary hydrate formation reactor
13. fifth valve
14. primary hydrate decomposition reactor
15. sixth valve
16. primary hydrate pump
17. seventh valve
18. primary hydrate heat exchanger
19. primary hydrate cooling tower
20. eighth valve
21. secondary high-concentration methane compressor
22. ninth valve
23. secondary high-concentration methane heat exchanger

24. secondary high-concentration methane cooling tower
25. tenth valve
26. methane primary outlet valve
27. secondary high-concentration methane hydrate formation reactor
28. eleventh valve
29. carbon dioxide primary outlet valve
30. secondary high-concentration methane hydrate decomposition reactor
31. methane hydrate decomposition water pump
32. twelfth valve
33. methane hydrate decomposition water heat exchanger
34. methane hydrate decomposition water cooling tower
35. secondary high-concentration carbon dioxide compressor
36. thirteenth valve
37. secondary high-concentration carbon dioxide heat exchanger
38. secondary high-concentration carbon dioxide cooling tower
39. fourteenth valve
40. methane secondary outlet valve
41. secondary high-concentration carbon dioxide hydrate formation reactor
42. fifteenth valve
43. carbon dioxide secondary outlet valve
44. secondary high-concentration carbon dioxide hydrate decomposition reactor
45. sixteenth valve
46. carbon dioxide hydrate decomposition water pump
47. seventeenth valve
48. carbon dioxide hydrate decomposition water heat exchanger
49. carbon dioxide hydrate decomposition water cooling tower
50. eighteenth valve
51. system heat exchanger
52. system cooling tower
53. nineteenth valve
54. user valve
55. user-side heat exchanger
56. user side
57. sequestered gas compressor
58. carbon dioxide injection port
59. sequestration monitoring system
60. water outlet
61. porous medium.

EMBODIMENTS

FIG. illustrates the device for separating and sequestering $CO_2$ coupled with cold storage in mixed gas by hydrate method to separate $CO_2$ in biogas, for example, which includes a gas compression device, a refrigeration cycle device, a hydrate formation/decomposition device, a hydrate cold storage device, a water circulation device, a gas hydrate sequestration device, and a sensing and monitoring device.

The gas separation system of the device is provided with a primary separation trunk circuit and two parallel separation branches, with the primary separation trunk circuit being the biogas bottle 1, passing through the primary gas compressor 3, the primary biogas refrigeration cycle heat exchanger 5, the secondary gas compressor 7, the secondary biogas refrigeration cycle heat exchanger 9, the primary hydrate formation reactor 12 and the primary hydrate decomposition reactor 14 in sequence.

The secondary parallel separation branch includes two: the first one is for the recovery of carbon dioxide gas from the higher concentration methane separation gas, and the second one is for the purification of carbon dioxide gas from the primary hydration decomposition gas. The first branch passes through the secondary high-concentration methane compressor 21, the secondary high-concentration methane heat exchanger 23, the secondary high-concentration methane hydrate formation reactor 27, and the secondary high-concentration methane hydrate decomposition reactor 30. The second branch passes in turn through the secondary high-concentration carbon dioxide compressor 35, the secondary high concentration carbon dioxide heat exchanger 37, the secondary high concentration carbon dioxide hydrate formation reactor 41, and the secondary high concentration carbon dioxide hydrate decomposition reactor 44.

The carbon dioxide sequestration system of the device includes the gas compression device, the gas hydrate sequestration device and the sequestration monitoring device. The gas compression device consists of the sequestration gas compressor 57, and the gas hydrate sequestration device consists of the carbon dioxide injection port 58, the porous medium 61 and the water outlet 60.

The Gas compression device includes the biogas gas compression device and each decomposition gas compression device. The biogas gas compression device consists of the primary gas compressor 3, the secondary gas compressor 7 and the first valve 2, the second valve 4 and the third valve 8 in series. Each decomposition gas compression device consists of the secondary high concentration methane compressor 21 and the secondary high concentration carbon dioxide compressor 35, the ninth valve 22 and the thirteenth valve 36.

The refrigeration cycle device includes the gas refrigeration device (or unit), the circulating water refrigeration device (or unit) and the hydrate refrigeration device (or unit). The gas refrigeration unit includes the primary biogas refrigeration device, the secondary biogas refrigeration device and each decomposition gas refrigeration device. The primary biogas refrigeration device consists of the primary biogas cooling tower 6 and the primary biogas refrigeration cycle heat exchanger 5. The secondary biogas refrigeration device consists of the secondary biogas cooling tower 10 and the secondary biogas refrigeration cycle heat exchanger 9. Each decomposition gas refrigeration device consists of the secondary high concentration methane cooling tower 24 and the secondary high concentration carbon dioxide cooling tower 38, the secondary high concentration methane heat exchanger 23 and the secondary high concentration carbon dioxide heat exchanger 37.

The circulating water refrigeration device includes the primary circulating water cooling unit and the secondary circulating water cooling unit, with the primary circulating water cooling unit consisting of the primary hydrate cooling tower 19 and the primary hydrate heat exchanger 18, and the secondary circulating water cooling unit consisting of the methane hydrate decomposition water cooling tower 34 and the carbon dioxide hydrate decomposition water cooling tower 49, the methane hydrate decomposition water heat exchanger 33 and the carbon dioxide hydrate decomposition water heat exchanger 48.

The hydrate cooling unit includes the primary hydrate cooling unit and the secondary hydrate cooling unit, consisting of a $CO_2$ hydrate decomposition water cooling tower 49, a $CO_2$ hydrate decomposition water heat exchanger 48 and an eighteenth valve 50.

The hydrate formation/decomposition unit includes the primary hydrate formation unit, the primary hydrate decomposition unit, the secondary hydrate formation unit and a secondary hydrate decomposition unit. the primary hydrate formation unit consists of the primary hydrate formation reactor 12, an inlet line, an inlet pipe, an outlet pipe, a hydrate slurry transport line, a thermostatic cooling device, a fourth valve 11 and a fifth valve 20. The primary hydrate decomposition device consists of hydrate slurry delivery line, outlet pipe, outlet gas line and sixth valve 15. The secondary hydrate formation device and decomposition device consists of two parts: the first part is the recovery of carbon dioxide gas in the higher concentration methane separation gas, and the second part is the purification of carbon dioxide gas in the primary hydrate decomposition gas. The hydrate formation device of the first part consists of the secondary high-concentration methane hydrate formation reactor 27, inlet piping, inlet piping, outlet piping, hydrate slurry transport piping, thermostatic cooling device, the tenth valve 25 and the methane primary export valve 26. The secondary hydrate decomposition device consists of hydrate slurry transport piping, outlet piping, outlet piping, carbon dioxide primary export valve 29 and the nineteenth valve 53 constitutes. The hydrate formation unit in the second part consists of the secondary high-concentration carbon dioxide hydrate formation reactor 41, inlet piping, inlet piping, outlet piping, hydrate slurry delivery piping, thermostatic cooling device, the fourteenth valve 39 and the methane secondary valve 40. The secondary hydrate decomposition unit consists of hydrate slurry delivery piping, outlet piping, outlet piping, carbon dioxide secondary valve 43 and the sixteenth valve 45. The secondary hydrate decomposition unit consists of hydrate slurry delivery line, discharge line, gas outlet line, carbon dioxide secondary valve 43 and the sixteenth valve 45.

The hydrate cold storage device includes a primary hydrate cold storage device and a secondary hydrate cold storage device, which are connected in parallel. The primary hydrate cold storage device consists of the primary hydrate decomposition device 14, the user-side heat exchanger 55, the user-side 56 and the user valve 54. The secondary hydrate cold storage device consists of the secondary high concentration methane hydrate decomposition reactor 30 and the secondary high concentration carbon dioxide hydrate decomposition reactor 44. The secondary hydrate cold storage unit consists of the secondary high concentration methane hydrate decomposition reactor 30 and the secondary high concentration carbon dioxide hydrate decomposition reactor 44, user-side heat exchanger 55, user side 56 and user valve 54.

The water circulation device includes a primary water circulation device and a secondary water circulation device. The primary water circulation device consists of an inlet water line, primary hydrate pump 16, seventh valve 17, primary circulating water refrigeration device, and outlet water line. The secondary water circulation device consists of inlet water line, methane hydrate decomposition pump 31 and carbon dioxide hydrate decomposition pump 46, twelfth valve 32 and seventeenth valve 47, secondary circulating water refrigeration device and the outlet pipe.

The sensing and monitoring device includes a temperature sensor, a pressure sensor, a displacement sensor, a computer, and a signal line. Said computer is used to process data and signals and said temperature sensor, pressure sensor and displacement sensor are used to convert the corresponding signals into electrical signals for transmission to the computer.

Using the above gas separation device for recovering carbon dioxide in biogas by hydrate method, the steps are as follows:

First step, biogas is passed into the primary unit through a two-stage compression unit.

The biogas is passed into the primary gas compressor 3 and the secondary gas compressor 7 sequentially in the gas path, and the cooling between the two compressor stages is realized through the primary biogas refrigeration cycle heat exchanger 5 in the primary refrigeration device; the outlet biogas pressure of the secondary gas compressor 7 reaches the pressure conditions of the direct hydrate formation, and the cooling process of the outlet biogas is realized through the secondary biogas refrigeration cycle heat exchanger 9 in the secondary refrigeration device, and the cooling process of the biogas from the secondary. The temperature and pressure of the biogas flowing out of the secondary biogas refrigeration cycle heat exchanger 9 meets the required conditions for hydrate formation, and is passed into the primary hydrate formation reactor 12 for synthesis, completing the separation process of direct methane and carbon dioxide, and the generated hydrate slurry enters the primary hydrate decomposition reactor 14 through the fifth valve 13 for decomposition under reduced pressure, and decomposes to obtain carbon dioxide gas.

Second step, the higher concentration of methane produced by the primary formation unit is passed into the secondary unit.

The higher concentration methane gas generated by the primary hydrate formation device passes through the second high concentration methane compressor 21, the compressed gas is cooled down by the secondary high concentration methane heat exchanger 23 in the refrigeration device, and the high pressure and low temperature higher concentration methane mixture enters the secondary high concentration methane hydrate formation reactor 27 for hydration formation, completing the separation process of secondary higher concentration methane and carbon dioxide, and the generated hydrate slurry through the eleventh valve 28 into the secondary higher concentration methane hydrate decomposition reactor 30 for depressurization and decomposition to obtain higher purity carbon dioxide gas.

Third step, the higher concentration of carbon dioxide produced by the primary decomposition unit is passed into the secondary unit.

The higher concentration carbon dioxide gas generated by the primary hydrate decomposition device is passed through the secondary high-concentration carbon dioxide compressor 35, and the compressed gas is cooled down by the high secondary high concentration carbon dioxide heat exchanger 37 in the refrigeration device. The high-pressure and low temperature higher concentration carbon dioxide mixture enters the secondary high-concentration carbon dioxide hydrate formation reactor 41 for hydration formation, completing the secondary higher concentration carbon dioxide and methane carbon separation process. The generated hydrate slurry enters the secondary high-concentration carbon dioxide hydrate decomposition reactor 44 through the fifteenth valve 42 for decomposition under reduced pressure and decomposition to obtain high-concentration carbon dioxide gas.

Fourth step, the refrigeration cycle device maintains stable low-temperature conditions at all levels of the hydrate formation device.

The refrigeration cycle device adopts water circulation refrigeration mode, and the cooling water is cooled down to become chilled water through the system cooling tower 52, and the chilled water transfers the cooling capacity to the intermediate medium through the system heat exchanger 51, and the intermediate medium is used to maintain the stable low-temperature conditions of the primary hydrate formation reactor 12, the secondary high concentration methane hydrate formation reactor 27 and the high secondary concentration carbon dioxide hydrate formation reactor 41.

Fifth step, the hydrate storage device realizes the reuse of hydrate decomposition cold to ensure the cooling at the user side.

After the hydrate decomposition in the primary hydrate decomposition reactor 14, the secondary high-concentration methane hydrate decomposition reactor 30, and the secondary high-concentration carbon dioxide hydrate decomposition reactor 44 is decomposed under reduced pressure, the gas flows into the subsequent device through the gas pipeline, and the remaining cold volume of hydrate decomposition is transferred to the user side 56 through the user side heat exchanger 55 to ensure the cooling process at the user side 56.

Sixth step, the water circulation device realizes the recycling of decomposition water to ensure the continuous formation of hydrate.

The decomposition water generated by the primary hydrate decomposition reactor 14 is provided with circulating power through the primary hydrate pump 16, and the pressurized decomposition water is cooled down to the temperature conditions for hydrate formation through the primary hydrate heat exchanger 18 in the refrigeration circulation device and passed into the primary hydrate formation reactor 12 to ensure the continuous formation of hydrate.

The secondary device uses: the decomposition water generated by the secondary high-concentration methane hydrate decomposition reactor 30 is provided with circulating power through the methane hydrate decomposition water pump 31, and the pressurized decomposition water is cooled down by the cooling treatment of the refrigeration circulation device, cooled down to the temperature condition of hydrate formation through the methane hydrate decomposition water heat exchanger 33 in the refrigeration device, and passed into the secondary high concentration methane hydrate decomposition reactor 30 to ensure continuous formation of hydrate.

At the same time, the decomposition water generated by the secondary high-concentration carbon dioxide hydrate formation reactor 41 is provided with circulating power through the carbon dioxide hydrate decomposition water pump 46, and the pressurized decomposition water is cooled down to the temperature conditions for hydrate formation through the carbon dioxide hydrate decomposition water heat exchanger 48 in the refrigeration unit and passed into the secondary high concentration carbon dioxide hydrate formation reactor 41 to ensures continuous hydrate formation.

Seventh step, carbon dioxide gas obtained from the gas separation unit is stably sequestered in porous medium as gas hydrate.

The carbon dioxide gas obtained from the gas separation unit is collected through a parallel line, and passed into the sequestered gas compressor 57 for pressurized compression. After the pressure of the gas meets the pressure conditions for the production of carbon dioxide hydrate, it is passed through the carbon dioxide injection port 58 into the porous medium 61. The carbon dioxide gas hydrate forms with the water in the porous medium 61, i.e. the carbon dioxide is stably sequestered in the form of a hydrate. In order to keep the pressure of the porous medium 61 stable, the water outlet 60 is provided. At the same time, a separate sequestration monitoring system is provided for real-time monitoring of the various parameters in order to ensure a smooth progress of the entire sequestration process.

What is claimed is:

1. A device for separating and sequestrating carbon dioxide in mixed gas by hydrate method coupled with cold storage, comprising:

a gas separation system of the device is provided with a primary separation trunk circuit and two parallel separation branches, the primary separation trunk circuit is a biogas bottle, connected to a primary biogas refrigeration cycle heat exchanger by a primary gas compressor and then connected to a secondary biogas refrigeration cycle heat exchanger by a secondary gas compressor, and then connected in turn to a primary hydrate formation reactor and a primary hydrate decomposition reactor; said primary hydrate decomposition reactor is connected to the primary hydrate formation reactor via a primary hydrate pump and a primary hydrate heat exchanger; said primary biogas refrigeration cycle heat exchanger is connected to a primary biogas cooling tower for circulating heat exchange, and the secondary biogas refrigeration cycle heat exchanger is connected to a secondary biogas cooling tower for circulating heat exchange;

the two parallel separation branches include a first branch and a second branch, the first branch is to recover carbon dioxide gas from the higher concentration methane separation gas, and the second branch is to purify the carbon dioxide gas from the primary hydrate decomposition gas; wherein the carbon dioxide gas is sequestered into gas hydrate in a porous medium through a sequestered gas compressor; the first branch is connected from the primary hydrate formation reactor through a secondary high concentration methane compressor, a secondary high concentration methane heat exchanger, a secondary high concentration methane hydrate formation reactor and a secondary high concentration methane hydrate decomposition reactor; the secondary high concentration methane hydrate decomposition reactor is connected to the secondary high concentration methane hydrate formation reactor via a methane hydrate decomposition water pump and a methane hydrate decomposition water heat exchanger; said secondary high concentration methane heat exchanger is connected to a secondary high concentration methane cooling tower for circulating heat exchange, and the methane hydrate decomposition water heat exchanger is connected to a methane hydrate decomposition water cooling tower for circulating heat exchange;

the second branch is connected from the primary hydrate decomposition reactor through a secondary high concentration carbon dioxide compressor, a secondary high concentration carbon dioxide heat exchanger, a secondary high concentration carbon dioxide hydrate formation reactor and a secondary high concentration carbon dioxide hydrate decomposition reactor in that order; the secondary high concentration carbon dioxide hydrate decomposition reactor is connected to the secondary high concentration carbon dioxide hydrate formation reactor via a carbon dioxide hydrate decomposition water pump, a carbon dioxide hydrate decomposition water heat exchanger formation; said secondary high concentration carbon dioxide heat exchanger is in heat exchange cycle with a secondary high concentration carbon dioxide cooling tower, and the carbon dioxide hydrate decomposition water heat exchanger is in heat exchange cycle with a carbon dioxide hydrate decomposition water cooling tower.

2. The device according to claim 1, wherein the device further comprises a total refrigeration system, which uses a system heat exchanger connected via pipelines to the primary hydrate formation reactor, the secondary high concentration methane hydrate formation reactor and the high secondary concentration carbon dioxide hydrate formation reactor, respectively.

3. The device according to claim 1, wherein the device also comprises a cold storage system, which uses the primary hydrate decomposition heat exchanger, the secondary high concentration methane hydrate decomposition reactor, and the high secondary concentration carbon dioxide hydrate decomposition reactor connected to a user-side heat exchanger via pipelines, respectively, and a heat exchange cycle is carried out between the user side heat exchanger and a user side.

4. The device according to claim 1, wherein the device further comprises a sensing and monitoring equipment, which comprises a temperature sensor, a pressure sensor, a displacement sensor, a computer, and the computer is used for processing data and signals, the temperature sensor, the pressure sensor, the displacement sensor are used for converting the corresponding signals into electrical signals for transmission to the computer.

5. The device according to claim 1, wherein the device comprises the porous medium provided with a water outlet, and various parameters of the porous medium are monitored in real time with a sequestration monitoring system.

* * * * *